United States Patent [19]
Ernvein

[11] 3,829,827
[45] Aug. 13, 1974

[54] ACOUSTICAL HOLOGRAPHY SYSTEM FOR ACOUSTIC IMAGE CONVERSION

[75] Inventor: Jöel Ernvein, Paris, France

[73] Assignee: Thomson-CSF, Paris, France

[22] Filed: May 23, 1972

[21] Appl. No.: 256,019

[30] Foreign Application Priority Data
May 28, 1971 France .............................. 71.19581
Aug. 27, 1971 France .............................. 71.31183

[52] U.S. Cl................. 340/5 H, 73/67.5 H, 350/3.5
[51] Int. Cl......................... G01s 9/66, G01n 29/04
[58] Field of Search....... 340/5 H, 5 MP; 73/67.5 H; 332/7.51; 356/5; 350/3.5

[56] References Cited
UNITED STATES PATENTS
3,564,904   2/1971   Brenden et al. ................. 73/67.5 H
3,600,935   8/1971   Baum .............................. 340/5 H OTHER PUBLICATIONS
Acoustic Holography, Vol. 3, pp. 173–179, Chapter 10, by P. S. Green, June 30, 1970.

Primary Examiner—Richard A. Farley
Attorney, Agent, or Firm—Cushman, Darby & Cushman

[57] ABSTRACT

The present invention relates to acoustical holography systems and more particularly to the liquid surface relief method of acoustic image conversion.

The system in accordance with the invention comprises means for optically reconstructing the acoustic hologram formed at the surface of a fluid; the operation of the reconstructing means is limited to the phases of insonification of the fluid surface.

9 Claims, 5 Drawing Figures

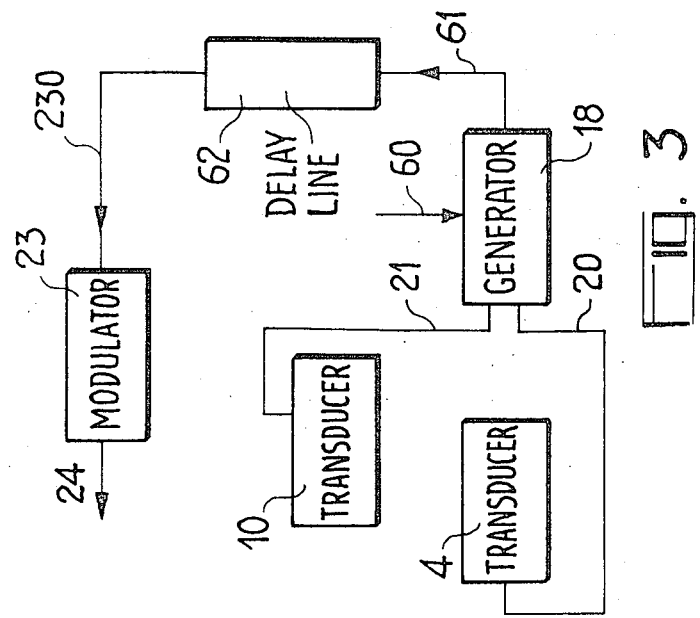
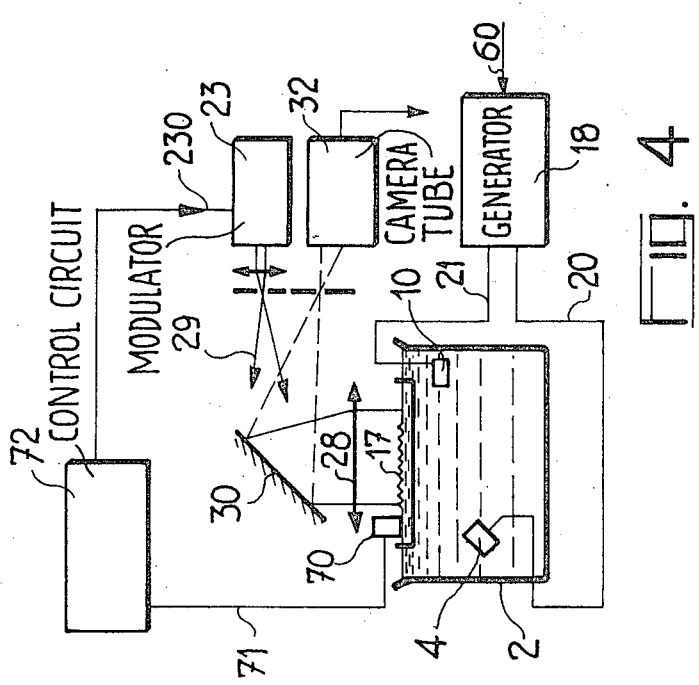

ACOUSTICAL HOLOGRAPHY SYSTEM FOR ACOUSTIC IMAGE CONVERSION

The present invention relates to acoustical holography, and more particularly to the liquid-surface-relief method of acoustic image conversion.

An improved optical detector is described which, in association with a conventional device for producing acoustical holograms, makes it possible to reconstruct them optically in the form of flawless images.

The acoustical hologram of a given object is obtained by means of two coherent ultrasonic sources which emit ultrasonic beams that interfere with one another. The beams are propagated in a fluid at whose surface they meet one another; one of the beams passes through the object before interfering with the other and the two beams produce a pattern of interference fringes causing ripples in the surface of the fluid. The elevation experienced by the fluid surface being proportional at any point to the ultrasonic intensity, this surface constitutes a true phase hologram of the object immersed in the fluid.

In order to improve the quality of these holograms, it is known to employ pulsed operation of the ultrasonic sources. The ultrasonic waves are produced in the form of a wave train whose duration is short compared with the recurrence period.

In the majority of systems currently in use, the real-time read out of ultrasonic holograms is effected by reconstructing them with coherent light. To this end, a light beam coming from a laser is reflected by the ultrasonic hologram formed at the surface of the fluid. The reflected light contains several diffracted radiation components one of which is selected by a diaphragm to form a reconstructed image of the object.

Unfortunately, the minimum ripple pitch which it is possible to produce at the surface of the fluid is relatively large and the corresponding diffraction orders close together, so that selection of the effective radiation can only conveniently by done using a diaphragm with a very small aperture. If the diaphragm aperture is increased then the unwanted light cannot be adequately eliminated. In addition, with coherent illumination, the use of a very small diaphragm aperture produces speckle in the reconstituted image, and this can be a source of major disturbance.

The invention also relates to the insonification system which makes it possible to produce the acoustic holograms at the surface of the image of a thin section of the object and the superimposition of a reference ultrasonic radiation. The projection of an ultrasonic image can be effected by means of liquid acoustic lenses however, these exhibit major aberrations due in particular to the presence of the envelopes which are needed to separate their contents from the liquid in which they are immersed. These aberrations can be avoided to some extent by substituting mirrors for the acoustic lenses, but because of their relatively modest dimensions compared with the wavelength of the ultrasonic radiation used, care has to be taken to reduce as far as possible the cause of distortion such as imperfections in the ultrasonic sources and geometric aberrations.

The object of the present invention is to overcome these drawbacks. According to the present invention, there is provided an acoustic holography system for displaying the image of an object immersed in a fluid filling an ultrasonic tank, said system comprising: ultrasonic generator means for forming at the surface of said fluid an acoustic hologram of said object, and optical means for reconstructing from said hologram an image of said object; said ultrasonic generator means operating in accordance with a cycle having alternately a rest phase and a working phase; optical chopper means being provided to limit the operation of said optical reconstructing means to the phase during which said acoustic hologram exists.

For a better understanding of the invention and to show how the same may be carried into effect, reference will be made to the ensuing description and attached figures among which:

FIG. 1 schematically illustrates an acoustic holography system in accordance with the invention;

FIGS. 3 and 4 illustrates different variant embodiments of the invention;

In all the figures, identical elements carry identical references.

Figure 1:
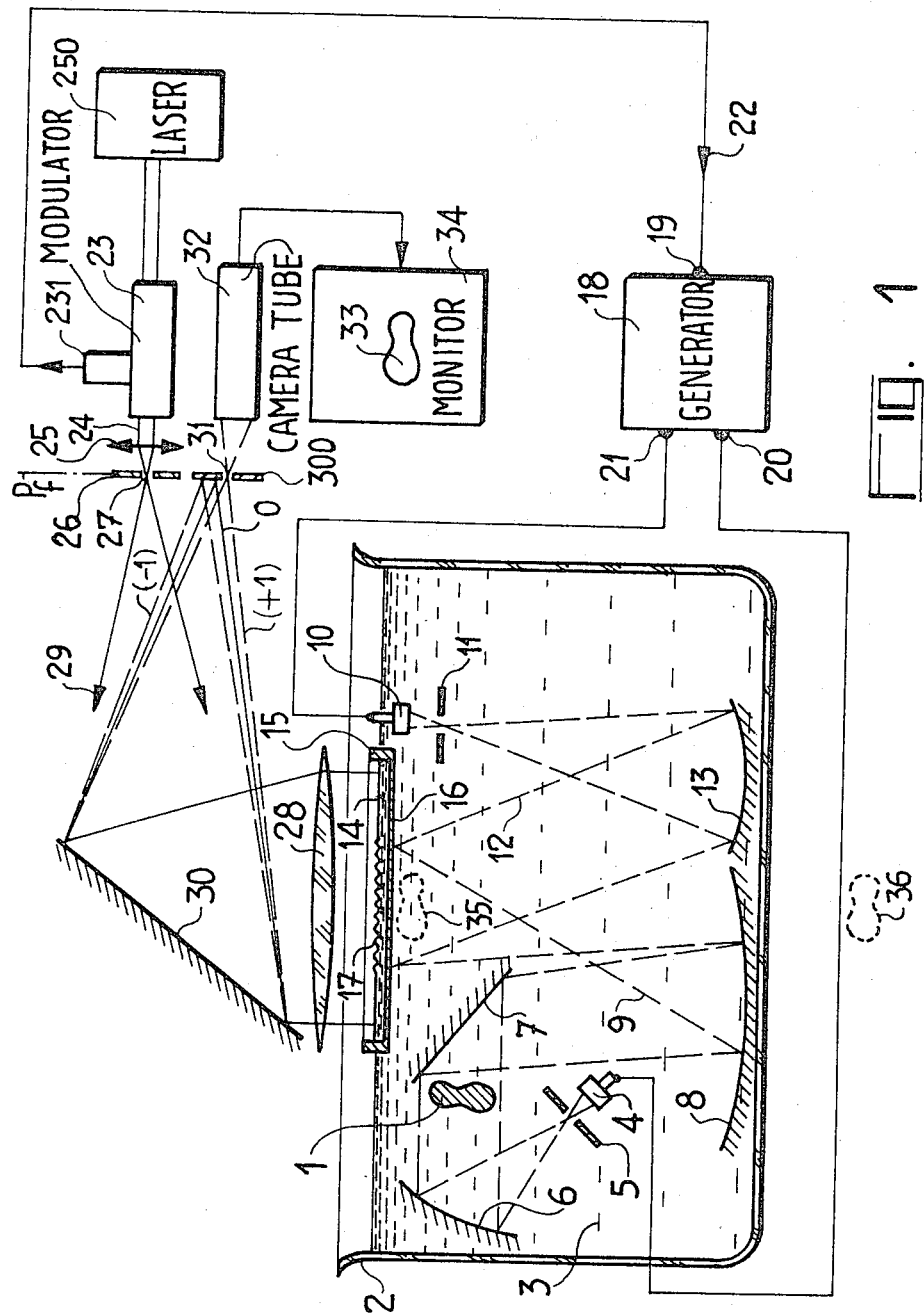

In FIG. 1, the object 1 being observed is placed inside a vessel 2 containing a fluid 3. A first ultrasonic source 4 which may be an electromechanical transducer for example, acoustically illuminates the object through a diaphragm 5 and through a spherical reflector mirror 6. The ultrasonic wave emerging from the object is picked up and projected by the flat mirror 7 onto the spherical mirror 8 by which it is reflected along trajectory 9, towards the surface of the liquid. A second ultrasonic source emits through a diaphragm 11 an ultrasonic carrier wave 12 which is reflected by the spherical mirror 13 towards the surface of the liquid.

The respective position of the object, ultrasonic sources and the different mirrors, are adjusted so that the object wave and the carrier wave interfere at the surface of the liquid. In order to show up the interference fringes produced by the encounter between the two ultrasonic radiation components, the surface of the fluid is partially covered with a film of oil 14 contained in a tray 15 whose base is constituted by an extremely thin and light membrane 16 which does not prevent the transmission of the ultrasonic energy between the liquid 3 contained in the vessel 2, and the oil film 14. The membrane 16 can, for example, be made of a film of polycarbonate or "Mylar." The ultrasonic radiation pressure exerts a lift force on the oil film which, at any point, depends upon the received acoustic intensity; this lift is illustrated at 17 in the form of a wavy line at the oil surface. This wavy line corresponds, in fact, to a relief pattern constituting the acoustic hologram of the object 1.

The two ultrasonic sources 4 and 10 are supplied from a generator 18 having a trigger input 19 and two outputs 20 and 21 respectively connected to the transducers 4 and 10. Taking into account the difference between the trajectories and therefore the time of propagation, of the two acoustic waves within the vessel, the generator 18, in a manner known per se, feeds the two transducers in a drive-staggered fashion so that the carrier wave and the object wave reach the surface of the liquid simultaneously. The trigger input 19 receives a signal 22 controlling the emission of the pulses available in the channels 20 and 21 for feeding the transducers 4 and 10.

In accordance with the invention, the generator 18 receives an electrical control signal 22 applied to the input 19, each time the modulator 23 is in a position such that it allows the light radiation coming from the laser 250 to pass. However, in order to compensate for the difference in propagation times due to the difference in the speeds of propagation of the ultrasonic and optical waves, synchronising means 231 associated with the optical modulator 23 are provided so that, the optical signal leaving in the form of light pulses the modulator, reaches the surface of the liquid at the same instant as the ultrasonic pulses. During the thus defined cycle of operation, the radiation 24 of the modulator 23 is focussed by a lens 25 and passes through a diaphragm 26 containing a selection aperture 27 located in the plane $P_f$ which is located at the focus of lens 28. The light radiation 29 leaving the aperture 27 and reflected by the inclined mirror 30, illuminates the surface of the oil film 14 and in particular the hologram 17. The aperture 27 is very slightly offset in relation to the optical axis of lens 28. This arrangement enables the radiation diffracted by the hologram to be focussed across the lens 28 in the plane $P_f$ beyond the aperture 27 allowing the incident radiation 29 to pass. Thus, in the plane $P_f$, the diffraction orders scattered by the acoustic hologram 17 at either side of the central diffraction order marked O and indicated in full line, are obtained. In addition to the diffraction order O, the diffraction orders (+1) and (−1) have been shown, by way of example, in broken line in the figure. The diaphragm 300 makes possible with the help of an aperture 31 the spatial selection of the diffraction order which serves to optically reconstruct the acoustic hologram.

The optical information carried by the light radiation can be picked up, at axis from the aperture 31, on a photographic plate (not shown in the figure) in the case of an optical recording, or upon the target of a vidicon 32. In the latter case, an image 33 of the object 1 can be observed upon the screen of a cathode-ray tube 34 coupled to the vidicon 32. In order for this information to pass the diaphragm 300 and appear on the target of the vidicon 32, which target is arranged very close to the plane $P_f$, the design of the set of mirrors contained in the vessel 2 should be such that the acoustic hologram is capable of projecting an acoustic image 35 of the object 1 very close to its surface. Since the acoustic wavelength is much longer than the optical wavelength of the light radiation used for reconstruction, a virtual optical image 36 is formed a substantial distance below the hologram 17 as soon as the acoustic image is projected away from the latter. Under these circumstances, the real image appears on the vidicon target 51 which is arranged very close to the diaphragm 31, the latter itself being disposed at the focus of the lens 28. It should be understood that in the drawing, the respective distance of the images 35 and 36 are not to scale.

In accordance with the invention, the cycle of illumination produced by the optical modulator 23 coincides substantially with the cycle of formation of the acoustic hologram at the surface of the liquid. This kind of operation is made possible by the fact that the times required for the establishment and disappearance of the oil, are very short compared with the duration of the ultrasonic excitation so that there is no loss of useful information by limiting the illumination of the oil film to this duration.

In turn, the quantity of unwanted light which has been enabled to pass the aperture 31 in the selector diaphragm, because of the proximity of neighbouring diffraction orders, is reduced in the ratio of the phases of illumination and obturation. This is particularly so in the case of the zero diffraction order which is extremely bright. In an example, which is in no way intended as a limitation of the scope of the invention, the optical modulator 23 supplies light pulses whose duration is in the order of 500 microseconds, at a recurrence period od 10 milliseconds. The result is that the effects of the unwanted light are reduced in the ratio of 1/20.

Figure 2:
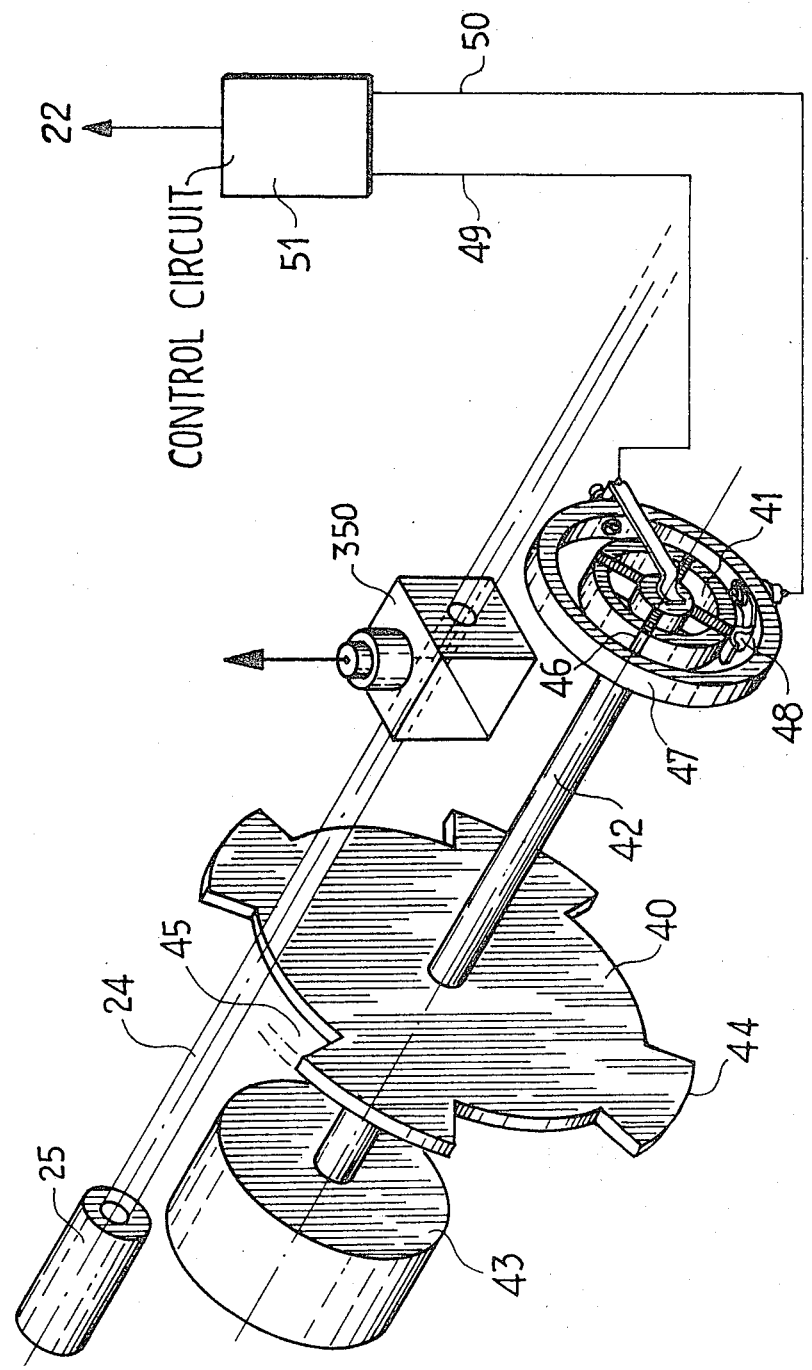
FIG. 2 illustrates a shutter assembly for use in the system of FIG. 1.

FIG. 2 schematically illustrates an embodiment, in no way intended as a limitation of the scope of the invention, of the optical modulator 23 and the synchronizing means 231 described in FIG. 1.

This optical modulator is constituted by a disc 40 carried by a shaft 42 which is rotated at a constant speed by a motor 43. The rotating disc 40 is made up of opaque sectors 44 alternating with slots 45 which pass the light rays.

During the rotation of the disc 40, the optical radiation 24 produced by laser 250 is alternately interrupted and transmitted to the hologram. The optical pulses appearing at the output of the modulator 23 periodically illuminate the surface of the liquid through the optical system described in FIG. 1 but not shown in FIG. 2. The frequency and duration of the light pulses resulting from this chopper action, are determined by the speed of the disc 40 and the number of transparent and opaque sectors which constitute it.

The coincidence between the time of appearance of the optical signal at the hologram and the arrival of the acoustic waves at the surface of the liquid, can be achieved in a variety of ways. In FIG. 2, by way of a non-limitative example, this result is obtained by using a second rotating disc 41 assembled on the same shaft 42 as the first slotted disc 40 and thus rotating at the same speed thereas. The synchronising disc 41 is provided on its surface with as many contact studs 46 as there are transparent sectors 45 on the modulator disc 40. An adjustable ring 47 concentric with the mobile disc 41, is used as a carrier for a brush 48 which is designed to make contact on passage of the conductor studs 46 carried by the synchronising disc 41. The conductor studs 46 are connected with on another and this interconnected arrangement is itself connected to an output terminal 49 whilst the brush 48 is connected to the other terminal 50, completing an electrical circuit 51 which can supply a trigger signal 22 to the generator 18 shown in FIG. 1.

The speed of propagation of the light waves is substantially higher than the speed of propagation of the ultrasonic waves so that it is necessary to establish a time delay in the light pulse in relation to the ultrasonic pulse. This delay is obtained by appropriate orientation of the ring 47. If the light radiation passes a first transparent sector at the time $T_0$ and the next transparent sector at the time $T_2$, then the first stud should meet the brush 48 at the time $T_1$, between $T_0$ and $T_2$ so that $T_2 - T_1$ corresponds to the difference in propagation time of the optical and ultrasonic signals from their respective sources to the liquid surface where the acoustic hologram is formed.

Thus, when the optical signal triggered at the time $T_2$ appears at the surface of the liquid, the acoustic signal triggered previously at the time $T_1$ will reach said surface at said time $T_2$. The conductor studs 46 of the synchronising disc 41 can be replaced by a system of photoelectric cells 350 each detecting transits of the light radiation across a transparent sector of the modulator disc 44 and each emitting a trigger signal applied to the ultrasonic pulse generator. As in the foregoing case, the position of the photoelectric cell is chosen so that it introduces the requisite time delay between the light emission and the ultrasonic emission, in order to compensate for the difference in propagation time.

FIG. 3 schematically illustrates another variant embodiment of a device for synchronising the light radiation with the acoustic radiation. Unlike the case with the preceding embodiment described, the optical modulator is controlled by the ultrasonic pulse generator instead of the other way round.

Only that part which is essential to an understanding of the invention, has been illustrated in this figure where elements which are identical to those shown in the preceding figures, carry the same references.

As soon as a control signal 60 is applied to the terminals on the generator 18, this latter excites the transducer 4 through the channel 20 and the transducer 10 through the channel 21. At the same time it transmits a signal 61 to the light modulator 23 which can in this case be an electro-optical modulator. This signal 61 passes through a delaying means which can be constituted, for example, by a delay line 62 before application to the modulator 23. Taking the same time references as in the previous case, if the generator 18 supplies ultrasonic energy at the time $T_1$, the delay line 62 must delay the signal 61 by the time $dT$ such that ($T_1 + dT$) is equal to $T_2$. At the instant $T_2$, the output signal 230 from the delay line 62 places the optical modulator 23 in the state in which the hologram is illuminated.

FIG. 4 illustrates a third variant embodiment of the hologram read out device in accordance with the invention. The generator 18 controlled by a trigger signal 60, respectively feeds the transducers 4 and 10 through the channels 20 and 21. The object and carrier ultrasonic waves interfere at the surface of the liquid contained in the vessel 2 and form the hologram 17 on an object which has not been shown in the figure, this under the same conditions as in the case of FIG. 1. An ultrasonic radiation detector 70, for example a hydrophone, placed in the plane of the hologram 17, detects the arrival of the ultrasonic waves at the surface of the liquid, and emits a trigger signal 71. An amplifier 72 transmits the amplified trigger signal 230 to the optical modulator 23. The light radiation emitted at this instant illuminates the hologram through the optical system constituted by the mirror 30 and the lens 28. The radiation reflected by the hologram 17 is picked up on the target of a vidicon 32, as described hereinbefore. Under these conditions, the detector 70 ensures synchronisation between the optical illumination and the establishment of the hologram at the surface of the liquid.

Figure 5:
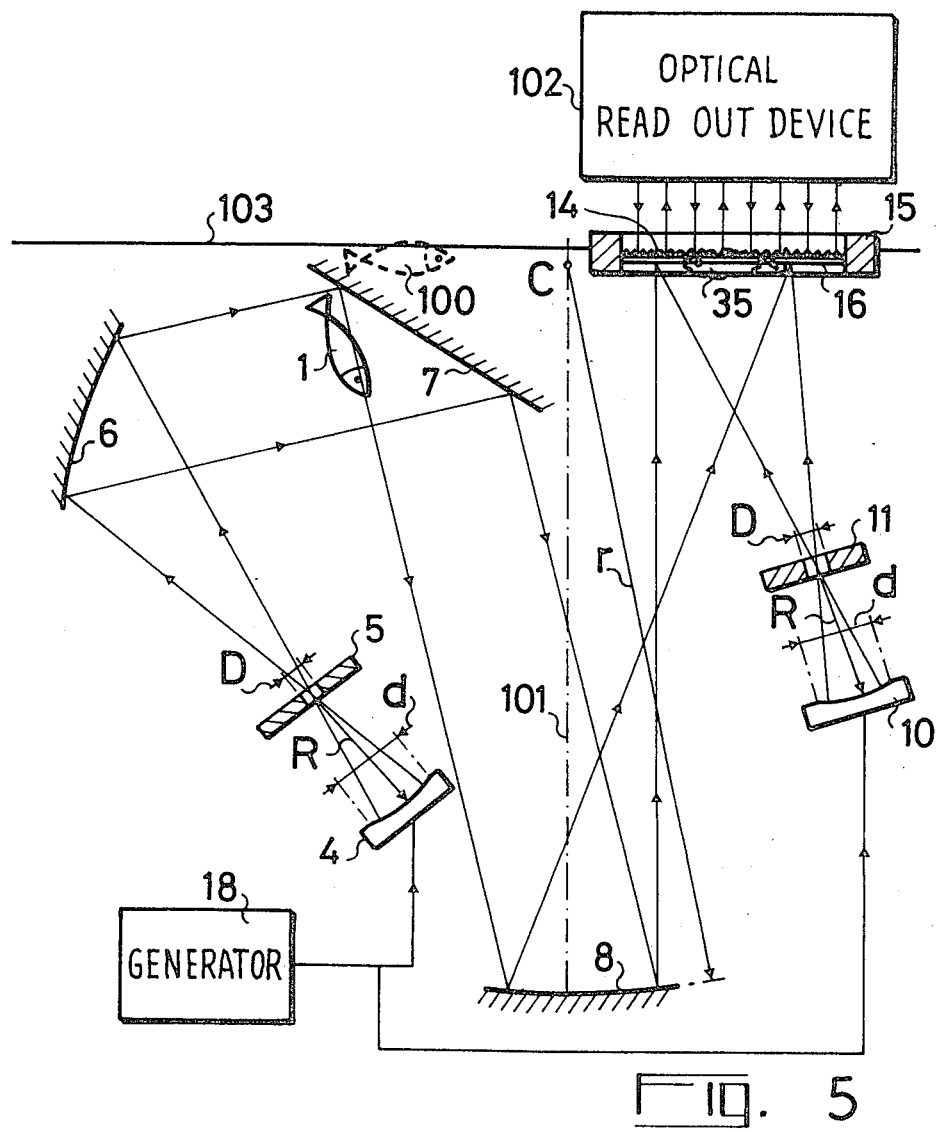
FIG. 5 illustrates an insonification assembly in accordance with the invention.

In FIG. 5, there can be seen the elements located beneath the surface 103 of the liquid contained in an ultrasonic vessel. To simplify matters, the majority of the references used are identical with those in FIG. 1.

The object 1 of which the acoustic hologram is to be formed by means of the ultrasonic detector cell 14, 15, 16, is illuminated by an electromechanical transducer 4 supplied from a generator 18. To this end, the emissive face of the transducer 4 is cut in the form of the tap of a sphere, in order to emit ultrasonic radiation which converges at the focus of a concave mirror 6. The mirror 6 reflects onto the object 1 a substantially parallel ultrasonic beam which passes through the object and in so doing experiences a modulation which is a function of the transparency of the object 1 to ultrasound. The modulated ultrasonic radiation coming from the object is reflected by the flat mirror 7 onto a concave spherical mirror 8 which in turn projects it onto the receiving face 16 of the ultrasonic detector cell 14, 15, 16.

As hereinbefore described the detector cell is made up of a cup structure comprising a ring 16 and a tensioned diaphragm 16 upon which there reposes a film of oil 14. The acoustic hologram is a pattern of interference fringes appearing in the form of ripples at the surface of the oil film 14; these ripples are produced by the radiation pressure of the overall ultrasonic radiation received by the face 16 which is in contact with the liquid in the ultrasonic vessel. The optical reconstruction of the acoustic hologram can be carried out instantaneously with the latter's formation, using an optical device 102 of the kind already described. The ultrasonic object radiation which is incident upon the face 16, interferes with an ultrasonic reference radiation stemming from a second electromechanical transducer 10, likewise excited by the generator 18.

The quality of the images reconstructed from the acoustic hologram is improved if it is arranged for the wave fronts of the radiations emitted by the transducers, to be substantially flat or spherical; it is likewise necessary to limit the geometric aberrations in the mirrors which are involved in the formation of the ultrasonic image of the object 1.

As far as the two ultrasonic sources are concerned, a substantial improvement is observed if the emissive faces of the transducers 4 and 10 are given the form of hollow spherical caps of radius R; in addition, by arranging diaphragms at the point of convergence of the waves, it is possible to filter out parasitic radiation. The central hole in the diaphragms 5 and 11 shown in FIG. 5 has a diameter D substantially equal to the extent of the central lobe of the diffraction spot in the plane of convergence located at the distance R from the emissive faces. If d is the diameter of the emissive faces, then the result is that the diameter D of the diaphragm hole is substantially equal to $1.22 \lambda \cdot (R/d)$, where $\lambda$ is the ultrasonic wavelength.

By way of a non-limitative example, if the ultrasonic vessel is filled with water and if the ultrasonic frequency is made equal to 5 Mc/s, a transducer having an emissive face 20 mm in diameter and a radius of curvature R = 50 mm, will be suitably filtered by a diaphragm containing a hole of D = 1 mm.

As far as the geometric aberrations of the mirrors are concerned, the improvement which is introduced consists in utilising a spherical mirror 8 possibly associated with an additional mirror 7. The system should have a magnification substantially equal to $-1$. In FIG. 5, it can be seen that the additional mirror 7 is a flat mirror, which produces an undistorted image 100 of the object 1. The mirror 8 is a concave spherical mirror whose